(12) United States Patent
Wolf (10) Patent No.: US 11,285,647 B2
(45) Date of Patent: Mar. 29, 2022

(54) DEVICE FOR SECURING AND/OR RELEASING INJECTION MOULDS, MEANS AND METHOD

(71) Applicant: Stack Mold Plus UG (haftungsbeschränkt), Großwallstadt (DE)

(72) Inventor: Manfred Wolf, Großwallstadt (DE)

(73) Assignee: Stack Mold Plus UG (haftungsbeschränkt), Großwallstadt (DE)

( * ) Notice: Subject to any disclaimer, the term of this patent is extended or adjusted under 35 U.S.C. 154(b) by 38 days.

(21) Appl. No.: 16/624,703

(22) PCT Filed: Jun. 21, 2018

(86) PCT No.: PCT/DE2018/000193
§ 371 (c)(1),
(2) Date: Dec. 19, 2019

(87) PCT Pub. No.: WO2018/233742
PCT Pub. Date: Dec. 27, 2018

(65) Prior Publication Data
US 2020/0122373 A1 Apr. 23, 2020

(30) Foreign Application Priority Data
Jun. 22, 2017 (DE) ...................... 10 2017 005 903.9

(51) Int. Cl.
*B29C 45/33* (2006.01)
*B29C 45/26* (2006.01)
(52) U.S. Cl.
CPC .......... *B29C 45/33* (2013.01); *B29C 45/2606* (2013.01)
(58) Field of Classification Search
CPC ............................ B29C 45/33; B29C 45/2602
See application file for complete search history.

(56) References Cited

U.S. PATENT DOCUMENTS 3,013,308 A * 12/1961 Armour ................ B29C 45/006
29/451
3,433,450 A * 3/1969 Wayne ................ B29C 45/4005
249/67

(Continued)

FOREIGN PATENT DOCUMENTS

DE 202007006808 U1 * 7/2007 .......... B29C 45/332
DE 202007006808 U1 7/2007

(Continued)

OTHER PUBLICATIONS

Machine translation DE202007006808 (Year: 2007).*

(Continued)

*Primary Examiner* — Matthew J Daniels
*Assistant Examiner* — Wayne K. Swier
(74) *Attorney, Agent, or Firm* — Smartpat PLC (57) ABSTRACT

A device for securing and/or releasing injection moulds for plastics injection moulding includes a slide retainer that is located in a receiving mould region, can be pushed into predefined, complementary regions of a corresponding sliding mould region and comprises a roller which is rotatably mounted in a housing and over which the sliding mould region can roll. A spring-loaded pressure piece comprises the housing and a slide retainer spring that presses against the housing, for engaging in an opening in the sliding mould region. The housing has a pre-loading projection in a peripheral region for pre-loading by means of the slide retainer spring. One or more fixing screws run through the housing and is/are screwed into a complementary opening in the receiving mould region. A central lead-through means is provided and each of the one or more fixing screws runs through one through-opening of the lead-through means.

15 Claims, 6 Drawing Sheets

(56) References Cited

U.S. PATENT DOCUMENTS

| | | | | |
|---|---|---|---|---|
| 4,765,585 A | * | 8/1988 | Wieder | B29C 45/332 |
| | | | | 249/64 |
| 5,397,226 A | | 3/1995 | Vandenberg | |
| 2006/0013919 A1 | * | 1/2006 | Cerniglia | B29C 45/332 |
| | | | | 425/589 |
| 2008/0173786 A1 | * | 7/2008 | Chen | B29C 45/2675 |
| | | | | 249/102 |
| 2015/0204383 A1 | * | 7/2015 | Ishii | F04B 53/14 |
| | | | | 384/297 |

FOREIGN PATENT DOCUMENTS

| | | | | |
|---|---|---|---|---|
| JP | | 2000346106 A | 12/2000 | |
| WO | | 2006019504 A2 | 2/2006 | |
| WO | WO-2017042136 A1 | * | 3/2017 | B65B 51/30 |

OTHER PUBLICATIONS

Machine translation WO2017042136 (Year: 2017).*

Anonymous, "Mini-Might Slight Retainers", Apr. 4, 2016 (Apr. 4, 2016), p. 1, Retrieved from the Internet: URL: http://www.m-d-s.co.za/files/Slide-Retainers—PSR_opt_hek5qds8.pdf.

Anonymous, "Roller Slide Retainer—RIT", Sep. 15, 2016 (Sep. 15, 2016), p. 1, Retrieved from the Internet: URL:http://www.ermannobalzi.com/files/RIT/RIT_EN.pdf.

Anonymous, "Schieberhaltevorrichtung mit Gehäuse flach", Nov. 14, 2011 (Nov. 14, 2011), p. 1, Retrieved from the Internet: URL:https://ecom.meusburger.com/files/pdf/e/e3048.pdf.

Anonymous, "Schiebersicherung Z1892, Z1893", Apr. 25, 2016 (Apr. 25, 2016), p. 1-2, Retrieved from the Internet: URL:https://www.hasco.com/medias/Z1892-Z1893-EBH-DE-EN-FR.pdf?

Anonymous, "Slide Retainers", Mar. 18, 2015 (Mar. 18, 2015), p. 1-2, Retrieved from the Internet: URL:http://www.procomps.com/new/PRO-SRT-2015.pdf.

Anonymous, "SLK-25BLUE", Jun. 17, 2014 (Jun. 17, 2014), p. 1, Retrieved from the Internet: URL:https://www.supdie.com/wp-content/uploads/2015/10/slk_25b.pdf.

Progressive Components, "Progressive's SRT Series Slide Retainers", Feb. 14, 2017 (Feb. 14, 2017), p. 1, Retrieved from the Internet: URL:https://www.youtube.com/watch?v=QJxfyhOiTMQ.

* cited by examiner

DEVICE FOR SECURING AND/OR RELEASING INJECTION MOULDS, MEANS AND METHOD

TECHNICAL FIELD

The disclosure concerns a device for securing and/or releasing injection moulds for plastics injection moulding, a means for securing and a method for using a device for securing and/or releasing injection moulds for plastics injection moulding.

BACKGROUND

In plastics injection moulding, a plastic granulate is melted and injected into a cavity of an injection mould. In general, an injection mould for plastics injection moulding comprises a die portion and an ejector portion, as well as various other elements, such as a gate system, cavity inserts, ejector elements and a cooling.

When demoulding the injection moulded part, demoulding problems, for example due to undercuts, can be solved with the aid of a slide technology. Here, auxiliary parting lines are created in the injection mould by means of mould regions, that can slide away, in order to release critical areas of the injection mould which, for example, represent an undercut in the direction of demoulding. Mould regions, that can slide away, can be incorporated in the die portion or in the ejector portion. The mould regions, that can slide away, move transversely to the opening direction of the mould. When the mould is opened, the mould regions, that can slide away, protrude out of the side of the cavity at a fixed angle. The movement of the mould regions, that can slide away, can take place mechanically or hydraulically. During the demoulding process, in which the injection mould opens and the part is demoulded and ejected, a reliable hold of the mould regions, that can slide away, is performed in the desired position with the aid of a slide safety device, e.g. in the form of a slide retainer with a roller for rolling over and a slide catching spring.

SUMMARY

A goal of this disclosure is to provide a safe and reliable device for securing and/or releasing injection moulds for plastics injection moulding.

The goal is achieved by a device for securing and/or releasing injection moulds for plastics injection moulding, having at least two complementary, opposing injection mould portions, in particular a die portion and an ejector portion, comprising displaceable regions having mould regions, that can slide away, a slide retainer, that is located in a receiving mould region, can be pushed into predefined, complementary regions of the corresponding, mould region, that can slide away, comprising a roller which is rotatably mounted in a housing and over which the mould region, that can slide away, can roll, a spring-loaded pressure piece, comprising the housing and a slide retainer spring that presses against the housing, for engaging in an opening, in particular a groove or cut-out, in the mould region, that can slide away, the housing having a pre-loading projection in a peripheral region for pre-loading by means of the slide retainer spring, one or more fixing screws which run through the housing and is/are screwed into a complementary opening in the receiving mould region, a central lead-through means, located in the housing, is provided, wherein each of the one or more securing screws runs through one through-opening of the lead-through means, wherein by means of a contact projection on a periphery of the lead-through means a contact of the lead-through means at a corresponding continuous projection in an inner region of the housing is provided, and a lower face region provides a resting on a corresponding seat region with an edge region of the opening in the receiving mould region.

A slide protection is thus achieved by a safe engagement of the slide retainer in the mould region, that can slide away, whereby the slide is held while the injection moulded part is demoulded/ejected, thus ensuring a faultless injection moulding process and improving process reliability. The slide retainer is situated exactly in the recess and can safely fulfil the function of the slider safety device, in particular by means of the stabilizing lead-through. The mould region, that can slide away, is advantageously provided with an adapted recess, in particular a groove/cut-out, whereby the mould region, that can slide away, performs a movement over the slide retainer. The roller rolls around the axis and pushes the housing with the slide retainer spring downwards until the slide retainer reaches the recess in the mould regions, that can slide away, and engages there to secure it.

In particular, an exact installation height of the slide retainer can be achieved by means of the provided adapted lead-through means with the stabilizing contact projection and the lower face surface. An excessive tightening torque when screwing in, when applying force when screwing in, is prevented when inserting the device. The slide retainer is situated not too deep in the cut-out, so that there is sufficient spring travel and the function is fulfilled. Even after several cycles, the fixing screws are not loosening. The defined screw-in depth of the slide retainer during assembly can be set safely so that errors are avoided. The assembly is facilitated, since a safe guidance is given. The holes can also be deburred without disturbing the hold of the slide retainer. Due to the size of the contact surface of the stop, in particular enlarged by a factor of 10 compared to a ring surface for example, a defined screwing in of the slide retainer in the recess is ensured and the position can be maintained, whereby a reliable functional fulfillment of the slide retainer is guaranteed. The device has a compact design and makes it easier to assemble in the injection mould, the receiving/securing of the mould regions, that can slide away, is possible even with high slide weights and a very compact design at the same time. No lubrication is necessary and therefore also suitable for dust-free clean rooms. Exchangeable springs with different forces allow easy tuning It is advantageous, when the lower face region of the lead-through means has at least approximately one surface which is larger than an annular surface on an edge region around the opening or openings for the one or more fixing screws with a predefined thickness, in particular an annular surface with approximately 0.5-approximately 1 mm thickness.

It is advantageous, when the lower face region of the lead-through means is designed as an oval surface or as a circular surface projecting beyond an annular surface.

It is advantageous, when the contact projection of the lead-through means is designed as a continuous circumferential projection, in particular adapted to the shape of the lead-through means, in particular as an oval projection region or as a circular projection region and/or the projection region has a depth of approximately 15% of a diameter of the lead-through means.

It is advantageous, when a fixing screw is arranged eccentrically, in particular in an oval centre or eccentrically from a circular surface of the lower face region, and/or two fixing screws in each case are designed to project through the lower face region, in particular in each case in an oval centre of the oval surface or eccentrically from a circular surface of the lower face region and/or the It is advantageous, when the lower face region has a surface width which corresponds approximately to a diameter of a fixing screw.

It is advantageous, when larger fixing screws are to be used in proportion to the size of the housing, in particular M4 or M5 screws are to be used as fixing screws. Threads for screws smaller than M4 are very difficult to produce and usually have to be eroded, whereby the steel has a strength of 1100 N/mm2. Eroding is an expensive, complex procedure for this, which also causes high costs for repairs.

It is advantageous, when the slide retainer spring is exchangeable, so that, depending on the requirements of the mould regions, that can slide away, exchangeable slide retainer springs with different release forces/release holding force can be used.

The task will be solved as well by means for securing a slide retainer of a mould region, that can slide away, of an injection mould, having a roller rotatably mounted in a housing, a spring-loaded pressure piece, comprising the housing and a slide retainer spring which presses against the housing, having one or more fixing screws which, guided through the housing, can be screwed into a complementary opening in a receiving mould region, being possible to guide them through the housing, a central lead-through means being provided which is arranged in the housing, wherein the one or more securing screws are each guided through a through-opening of the lead-through means, wherein by means of a contact projection provided on a periphery of the lead-through means a contact of the lead-through means is provided on a corresponding circumferential projection in an inner region of the housing, and a lower face region forms a rest on a corresponding seat region for an opening in the receiving mould region.

The task will be solved as well by a method for using a device for securing and/or releasing injection moulds for plastics injection moulding, which have at least two complementary, opposing injection mould portions, in particular a die portion and an ejector portion, according to one of the claims 1 to 8, comprising displaceable regions with mould region, that can slide away (pusher), a slide retainer, which is arranged in a receiving mould region and is extended into predetermined, adapted regions of the corresponding, sliding mould region, comprising a roller rotatably mounted in a housing for rolling over by the mould region, a spring-loaded pressure piece comprising the housing and a slide retainer spring pressing against the housing for engaging in an opening, in particular a groove or cut-out, in the mould region, that can slide away, one or more fixing screws which are screwed through the housing into an appropriately designed opening in the receiving mould region, the one or more fixing screws being guided through in each case one through-opening of a central lead-through means arranged in the housing, wherein by means of a contact projection provided on a periphery of the lead-through means a contact of the lead-through means is established on a corresponding continuous projection in an inner region of the housing, and a lower face region (with an edge region) forms a rest on a corresponding seat region with an edge region of the opening in the receiving mould region.

Further characteristics and advantages of the invention result from the claims and the following description, in which examples of the execution of the object of the invention are explained in connection with the drawings.

DETAILED DESCRIPTION

Figure 1:
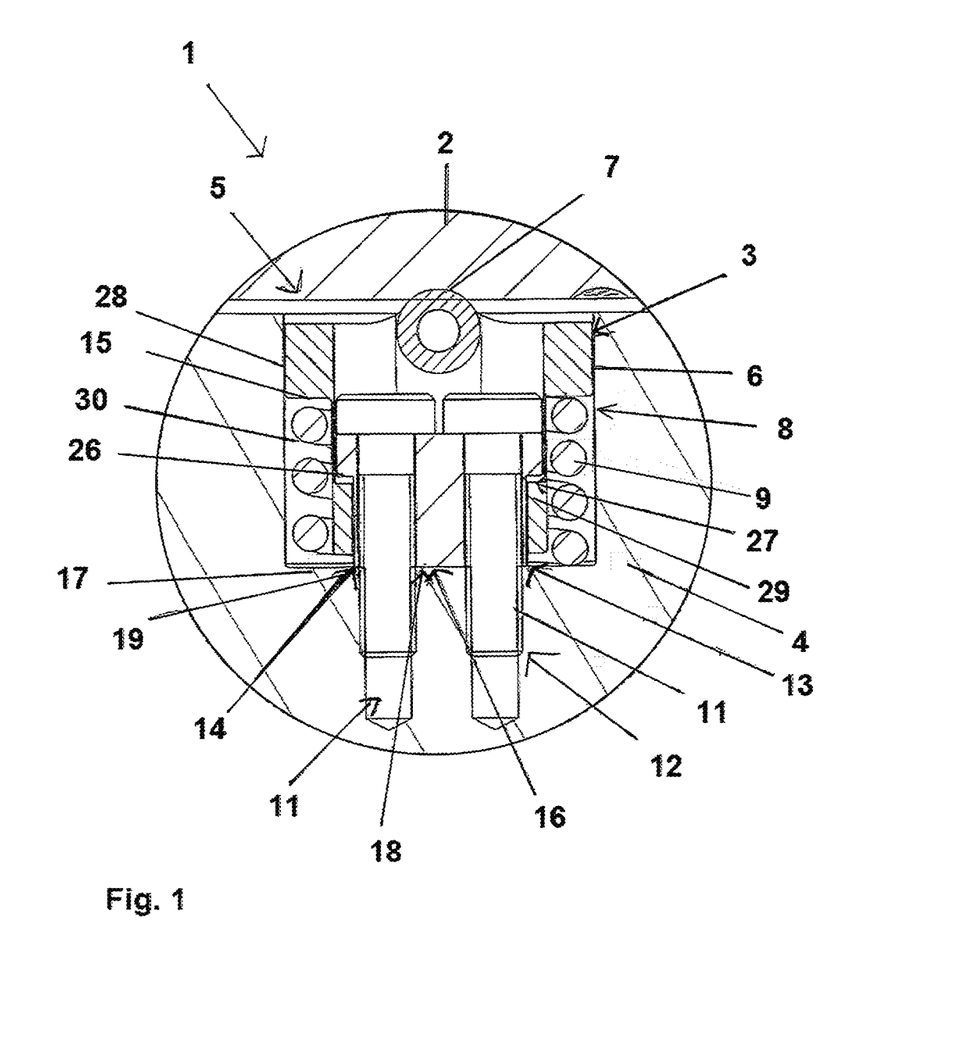
FIG. 1 shows a device for securing and/or releasing injection moulds.

FIG. 1 shows a device 1 for securing and/or releasing injection moulds for plastics injection moulding, which have at least two complementary, opposing injection mould portions, in particular a die portion and an ejector portion, comprising displaceable regions with mould regions 2, that can slide away, a slide retainer 3, which is arranged in a receiving mould region 4 and is extendable into predefined, adapted regions 5 of the corresponding, mould regions 2, that can slide away, comprising a roller 7 rotatably mounted in a housing 6 for rolling over by the mould regions 2, that can slide away, a spring-loaded pressure piece 8, comprising the housing 6 and a slide retainer spring 9 pressing against the housing 6, for engagement in a recess which is not shown, in particular a groove or recess, in the mould regions 2, that can slide away, one or more fixing screws 11, which is screwed through the housing 6 into a predefined formed opening 12 in the receiving mould region 4, wherein the one or more fixing screws 11 are passed through a through-opening 13 of a lead-through means 14 which is arranged in the housing 6. One or more fixing screws 11 are each passed through a through-opening 13 of the lead-through means 14, wherein by means of a contact projection 26 provided on a periphery 30 of the lead-through means 14 a contact of the lead-through means 14 is provided on a corresponding continuous projection 27 in an inner region 29 of the housing 6, and a lower face region 16 forms a support on a corresponding seat region 17 with an edge region 18 of the opening 12 in the receiving mould region 4.

A tension projection 15 for tensioning the housing 6 by means of a slide retainer spring 9 is provided, wherein the lead-through means 14 forms a stop 17 with an edge region 18 of the opening 12 in the receiving mould region 4 on a lower face region 16, wherein the lower face region 16 has at least approximately one surface 18 which is larger than an annular surface 19 with a predefined thickness, in particular with a thickness of approximately 0.5-approximately 1 mm around a fixing screw 11.

Figure 2:
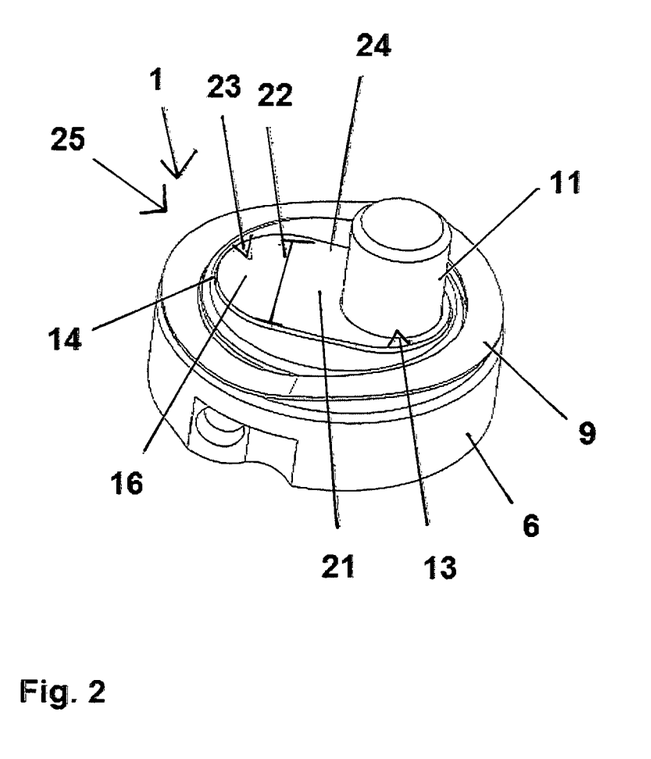
FIG. 2 shows a means for securing mould regions, that can slide away, in the form of a slide retainer.

FIG. 2 shows a means 25 for securing a mould region, that can slide away, in the form of a slide retainer with a view from below onto a lower face region 16. An example is a resting area with a large surface 23 and a surface width 22 shown as an oval surface 24, in which a fixing screw 11 is carried out in an eccentric oval centre 21.

Figure 3:
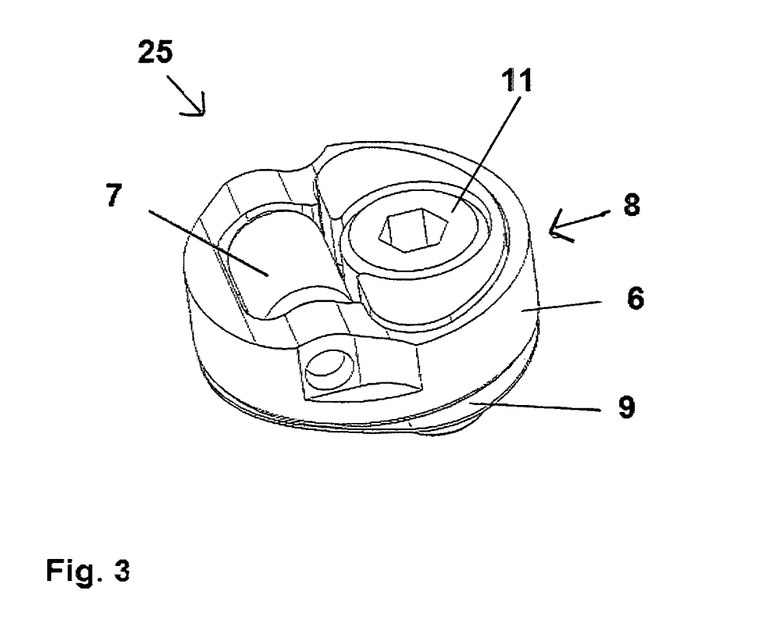
FIG. 3 shows a means of securing mould regions, that can slide away, in the form of a slide retainer.

FIG. 3 shows a means 25 for securing a mould region, that can slide away, in the form of a slide retainer from above with a roller 7 in the housing 6.

Figure 4:
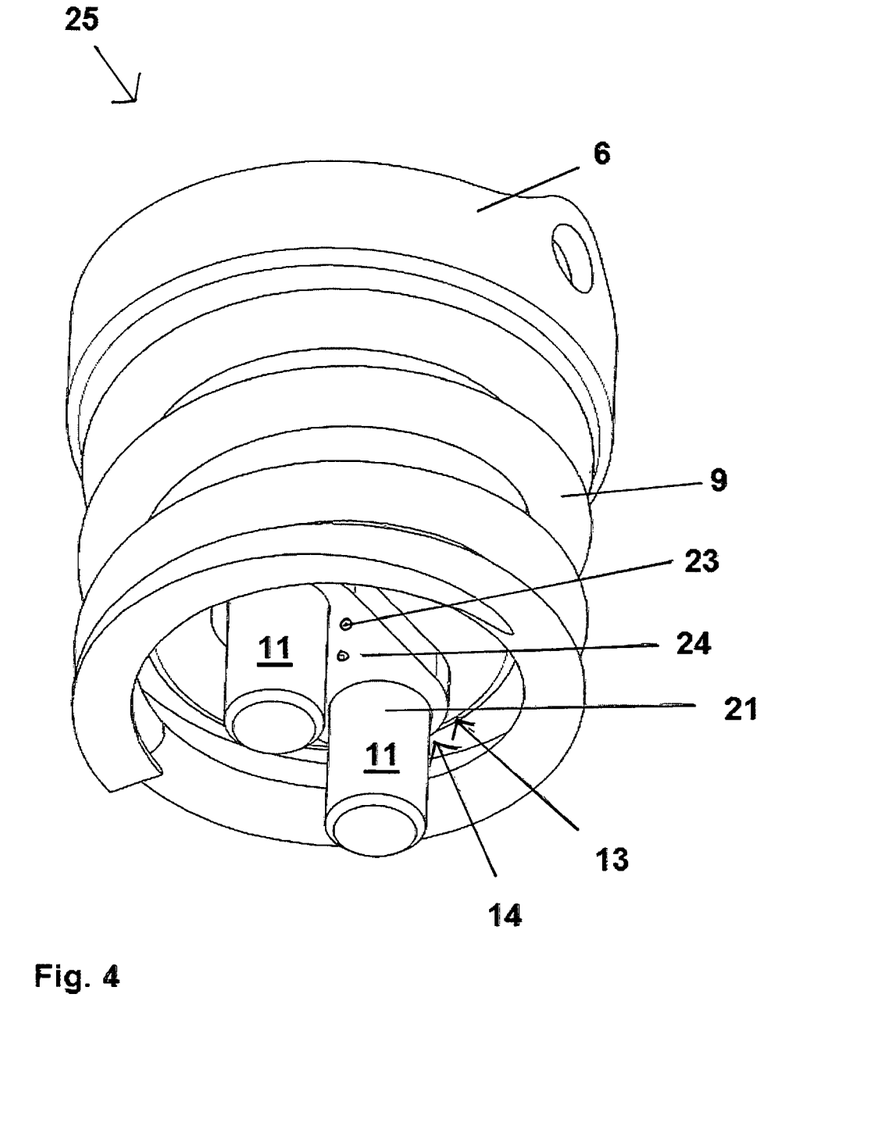
FIG. 4 shows a means of securing mould regions, that can slide away, in the form of a slide retainer.

FIG. 4 shows a means 25 for securing a mould region 2, that can slide away, in the form of a slide retainer 9 from below. As an example, a support area with a large surface 23 is shown as an oval surface 24, in which in two eccentric oval centres 21 a securing screw 11 is passed through a passage opening 13 in the lead-through means 14.

Figure 5:
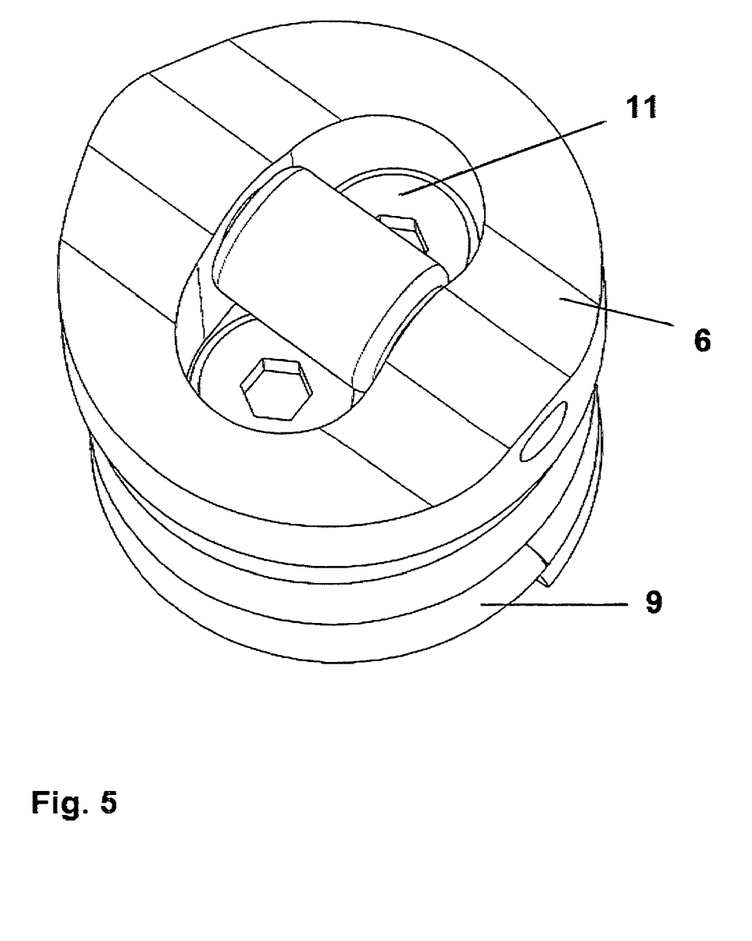
FIG. 5 shows a means for securing mould regions, that can slide away, in the form of a slide retainer.

FIG. 5 shows a means 25 for securing a mould region 2, that can slide away, in the form of a slide retainer 9 from above with a roller 7 in the housing 6.

The slide retainer comprises a housing and a roller, which is rotatably mounted on the housing by means of an axis. The housing is pushed upwards with a spring, whereby the pre-loading projection 15 limits the stroke. Here, a defined area of the roller extends beyond the highest point of the housing and forms the highest point of the slide retainer when installed. The stop is fixed with the help of one or two screws and guides the housing. The mould region, that can slide away, that is to be secured must be provided with a groove/cut-out, etc. The mould region must be secured with a groove/cut-out. The sliding mould region 2, that can slide away, makes a movement over the slide retainer, while the roller rolls around the axis and pushes the housing with the spring downwards. When the roller engages in the groove/cut-out of the slide, the slide retainer is pushed upwards by the spring and held in place by spring force.

Figure 6:
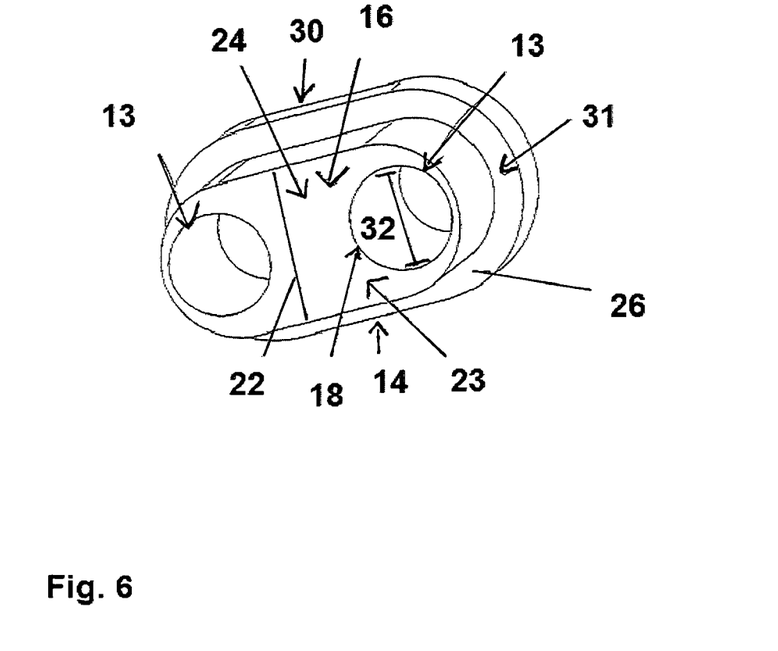
FIG. 6 shows a section of a device for securing mould regions, that can slide away.

FIG. 6 shows a detail to secure a mould region, that can slide away. A lead-through means 14 with two through-openings 13 for insertion into a housing, as illustrated in FIG. 1, 4, 5. The lower face area 16, for example, has a surface width of 22, which corresponds approximately to a diameter of 32 of a fixing screw not shown.

LIST OF REFERENCES

1 Device for securing and/or releasing
2 mould region, that can slide away
3 slide retainer
4 receiving mould region
5 complementary region
6 housing
7 roller
8 spring-loaded pressure piece
9 slide retainer spring
11 fixing screw
12 opening
13 through-opening
14 central lead-through means
15 pre-loading projection
16 lower face region
17 corresponding seat region
18 edge region
19 annular surface
21 oval centre
22 surface width
23 surface
24 oval surface
25 means
26 contact projection
27 continuous projection
28 peripheral region
29 inner region
30 periphery
31 oval projection region
32 diameter

The invention claimed is:

1. A device (1) for securing and/or releasing injection moulds for plastics injection moulding, having at least two complementary, opposing injection mould portions, in particular a die portion and an ejector portion, comprising
displaceable regions having mould regions (2), that can slide away,
a slide retainer (3), that is located in a receiving mould region (4), can be pushed into predefined, complementary regions (5) of the corresponding, mould region (2), comprising
a roller (7) which is rotatably mounted in a housing (6) and over which the mould region (2), that can slide away, can roll,
a spring-loaded pressure piece (8), comprising the housing (6) and a slide retainer spring (9) that presses against the housing (6), for engaging in an opening in the mould region (2), that can slide away,
the housing having a pre-loading projection (15) in a peripheral region (28) for pre-loading by means of the slide retainer spring (9),
one or more fixing screws (11) which run through the housing (6) and is/are screwed into a complementary opening (12) in the receiving mould region (4),
a central lead-through means (14), located in the housing (6), is provided,
wherein each of the one or more securing screws (11) runs through one through-opening (13) of the lead-through means (14) and secures the lead-through means (14) immovably in the opening (12) in the receiving mould region (4),
wherein by means of a contact projection (26) on a periphery (30) of the lead-through means (14) a contact of the lead-through means (14) at a corresponding continuous projection (27) in an inner region (29) of the housing (6) is provided, and a lower face region (16) provides a resting on a corresponding seat region (17) with an edge region (18) of the opening (12) in the receiving mould region (4).

2. The device according to claim 1, wherein the lower face region (16) of the lead-through means (14) has at least one surface (23) which is larger than an annular surface on an edge region (18) around the opening or openings (12) for the one or more fixing screws (11) with a predefined thickness.

3. The device according to claim 2, wherein the at least one surface is an annular surface (19) with 0.5-1 mm thickness.

4. The device according to claim 1, wherein the lower face region (16) of the lead-through means (14) is designed as an oval surface (24) or as a circular surface projecting beyond an annular surface.

5. The device according to claim 1, wherein the contact projection (26) of the lead-through means (14) is designed as a continuous circumferential projection.

6. The device according to claim 5, wherein the contact projection (26) of the lead-through means (14) is adapted to the shape of the lead-through means.

7. The device according to claim 6, wherein the contact projection (26) of the lead-through means (14) is an oval projection region (31) or as a circular projection region.

8. The device according to claim 6, wherein the projection region has a depth of approximately 15% of a diameter of the lead-through means (14).

9. The device according to claim 1, wherein a fixing screw (11) is arranged eccentrically.

10. The device according to claim 1, wherein
a fixing screw (11) is arranged eccentrically in an oval centre (21) or eccentrically from a circular surface of the lower face region (16), and/or
two fixing screws (11) in each case are designed to project through the lower face region (16), in each case in an oval centre (21) of the oval surface (24) or eccentrically from a circular surface of the lower face region (16).

11. The device according to claim 1, wherein the lower face region (16) has a surface width (22) which corresponds approximately to a diameter (32) of a fixing screw (11).

12. The device according to one of the claim 1, wherein larger fixing screws (11) are to be used in proportion to the size of the housing (6).

13. The device according to one of the claim 12, wherein M4 or M5 screws are used as fixing screws (11).

14. The device according to claim 1, wherein the slide retainer spring (9) is exchangeable, so that, depending on the requirements of the mould regions (2), that can slide away, exchangeable slide retainer springs (9) with different release forces/release holding force can be used.

15. A means (25) for securing a slide retainer of a mould region (2), that can slide away, of an injection mould, having
- a roller (7) rotatably mounted in a housing (6),
- a spring-loaded pressure piece (8), comprising the housing (6) and a slide retainer spring (9) which presses against the housing (6),
- having one or more fixing screws (11) which, guided through the housing (6), can be screwed into a complementary opening (12) in a receiving mould region (4), being possible to guide them through the housing (6),
- a central lead-through means (14) being provided which is arranged in the housing (6),
- wherein the one or more securing screws (11) are each guided through a through-opening (13) of the lead-through means (14) and secure the lead-through means (14) immovably in the opening (12) in the receiving mould region (4),
- wherein by means of a contact projection (26) provided on a periphery (30) of the lead-through means (14) a contact of the lead-through means (14) is provided on a corresponding continuous projection (27) in an inner region (29) of the housing (6), and a lower face region (16) forms a rest on a corresponding seat region (17) for an opening (12) in the receiving mould region (4).

* * * * *